US012728053B2

(12) United States Patent
Dunlap et al.

(10) Patent No.: US 12,728,053 B2
(45) Date of Patent: Sep. 8, 2026

(54) ANTI-ROLLBACK BRAKING SYSTEM FOR WHEELCHAIRS

(71) Applicants: Melissa Dunlap, Kearney, MO (US); Justin Jobe, Cambridge, IA (US)

(72) Inventors: Melissa Dunlap, Kearney, MO (US); Justin Jobe, Cambridge, IA (US)

( * ) Notice: Subject to any disclaimer, the term of this patent is extended or adjusted under 35 U.S.C. 154(b) by 475 days.

(21) Appl. No.: 18/505,243

(22) Filed: Nov. 9, 2023

(65) Prior Publication Data

US 2025/0152438 A1 May 15, 2025

(51) Int. Cl.

*A61G 5/10* (2006.01)
*F16D 63/00* (2006.01)
*F16D 65/16* (2006.01)
*F16D 121/06* (2012.01)

(52) U.S. Cl.

CPC .......... *A61G 5/1086* (2016.11); *A61G 5/1005* (2013.01); *F16D 63/006* (2013.01); *F16D 65/16* (2013.01); *F16D 2121/06* (2013.01)

(58) Field of Classification Search

CPC .... F16D 63/006; F16D 65/16; F16D 2121/06; A61G 5/1005; A61G 5/1086
USPC ........................................................... 188/69
See application file for complete search history.

(56) References Cited

U.S. PATENT DOCUMENTS 6,264,007 B1 7/2001 Norton
9,254,858 B2 * 2/2016 Shellenberger ......... B62B 9/085
2010/0225086 A1 9/2010 Hector
2014/0196991 A1 * 7/2014 Fite ......................... B62B 9/087 188/69
2014/0225340 A1 8/2014 Storch
2015/0136535 A1 * 5/2015 Smeeton ............... F16D 63/006 188/69
2015/0274187 A1 10/2015 Storch
2018/0229751 A1 * 8/2018 Yabuuchi .............. B62B 5/0438
2023/0095457 A1 * 3/2023 Kepner ................. B60B 33/025 16/35 R

FOREIGN PATENT DOCUMENTS

GB 2594691 A * 11/2021 ........... A61G 5/1097

* cited by examiner

*Primary Examiner* — Robert A. Siconolfi
*Assistant Examiner* — San M Aung
(74) *Attorney, Agent, or Firm* — Law Office of Julie Scott LLC

(57) ABSTRACT

The invention provides systems, kits, and methods for improved anti-rollback braking systems for personal conveyances such as wheelchairs. Unlike friction-based systems, the invention uses a pneumatic distribution system that uses pistons to engage an anti-rollback braking solution. The invention can be used by individuals with or without the assistance of another person because the braking system can engage automatically as a user gets out of their wheelchair. Systems of the invention can also provide reliable and more efficient manual brakes.

15 Claims, 6 Drawing Sheets

ANTI-ROLLBACK BRAKING SYSTEM FOR WHEELCHAIRS

FIELD OF THE INVENTION

The present invention relates to improved anti-rollback braking systems for manually operated conveyances such as wheelchairs and the methods of making and using them.

BACKGROUND OF THE INVENTION

Almost all manually propelled wheeled vehicles, such as wheelchairs, have manually operated locks that prevent the vehicle from rolling when an occupant either attempts to sit in or rise from it. Yet the friction brake often does not work properly or is all together forgotten by the user. These brakes require regular adjustment, repair, or replacement. It is not unusual for disabled individuals or their caregivers to not remember to set these brakes before trying to transfer in and out of a wheelchair. Other disabled individuals are physically unable to set the brakes. Both situations frequently result in falls, injuries, hospitalizations, and sometimes even death.

Because many wheelchair-dependent people do not remember to manually set a brake before trying to rise or sit, many wheelchairs have some type of anti-rollback feature. A variety of anti-rollback mechanisms have been used in wheelchairs, but each has its limitations or disadvantages. For example, some anti-rollback mechanisms require that the user can operate a hand lever or can apply pressure to an armrest to active the mechanism. Others require that a user is able to push a lever to exit the wheelchair or requires that another person activates the anti-rollback mechanism. Some anti-rollback mechanisms have proven to be expensive to construct or to retrofit to an existing chair, and others cannot be retrofitted to an existing chair. Some have been too complicated for users or caregivers to easily operate. Other anti-rollback mechanisms limit one or more features of a wheelchair such as the ability to fold a chair for storage or require the use of large diameter wheels. The most widely used anti-rollback mechanism is a metal plate that is under the seat sling, and with the user's weight, releases a bar(s) from the backside of the wheels. This widely used system has multiple problems such as dislodged plates and bars, an inability to be folded, or it cannot be applied to different types of wheelchairs.

SUMMARY OF THE INVENTION

Unlike previous solutions that rely on a friction-based braking system to prevent a wheelchair from rolling, the present invention uses a pneumatic distribution system that uses pistons to engage an anti-rollback braking solution. The invention can be used by those disabled by dementia, hemiplegia, paraplegia, muscle weakness or atrophy, limited hand force, or lacking a range of motion (ROM) or contractures because the braking system can engage automatically when a user rises from their wheelchair. Systems of the invention are triggered to automatically engage the anti-rollback feature when a sufficient amount of a user's weight shifts away from the wheelchair. The amount of weight that needs to be removed from the wheelchair to automatically engage the invention can be adjusted to suit a user's needs and preferences.

Advantageously, the present invention does not require continuous brake adjustments, brake extenders, brake handle build-ups, brake handle extension build-ups or adjusting brake lever placement as is commonly required by the friction-based brakes and anti-rollback systems that are currently on the market.

The present invention is compatible with all types of manual wheelchairs that are presently available. For example, the invention is compatible with lightweight, folding, manual tilt, pediatric, bariatric, and standard wheelchairs. The invention can be integrated into a new wheelchair or added to an existing one.

In addition, a manual lever of the invention can be attached to a wheelchair in a variety of locations so that the lever is readily accessible to the user, and a second person is not necessarily required to operate the invention. Alternatively, the manual lever can be attached to the frame of a wheelchair so that a caregiver can easily operate the lever to engage or disengage the invention.

The invention includes a means of manually overriding the automatic engagement of the anti-rollback feature so that an empty wheelchair can be rolled from one location to another without needing to add any weight to it. For example, the user will want to have manual control over the brakes for daily life tasks. Thus, the manual control lever can be mounted in any position that is convenient for the user. Moreover, the manual lever or additional lever could be mounted on the rear of the personal conveyance's frame or back rest for caregiver operation. In this latter configuration, if desired, the system can be deactivated using the manual caregiver lever.

More specifically, the invention provides a braking system for a personal conveyance that has an axle that is attached to a first wheel, a second wheel, and a frame, and the personal conveyance has a seat that is attached to the frame. The braking system comprises a first rotor brake hub that is situated around the inside of a first wheel hub on the personal conveyance; a second rotor brake hub that is situated around the inside of a second wheel hub on the personal conveyance; a first rotor hub clamp attached to the outside of the first wheel hub and a second rotor hub clamp attached to the outside of the second wheel hub; an air bladder attached to the seat of the personal conveyance; a first air cylinder attached to a first end of a first air hose, wherein a second end of the first air hose is attached to a first opening in a splitter and the first air cylinder has a pin and a spring; a second air cylinder attached to a first end of a second air hose, wherein a second end of the second air hose is attached to a second opening in the splitter and the second air cylinder has a pin and a spring; and either a third air cylinder or an air fitting.

If a third air cylinder is present, then it is attached to a manual lever and a third opening in the splitter. The third air cylinder includes a pin and a spring. Preferably, the third air cylinder is also attached to the frame. The third air cylinder and the manual lever may be attached to the frame in a variety of locations. The choice of location will depend upon the type of personal conveyance, a user's needs, and personal preferences.

If an air fitting is present, then it has a first end attached to the third opening in the splitter and a second end attached to the air bladder. Alternatively, a third air hose is present and has a first end attached to the air bladder and a second end attached to the air fitting.

In some preferred embodiments of the invention both the manual lever and the air fitting are present.

The personal conveyance may be a wheelchair, baby stroller or carriage. Preferably, the personal conveyance is a wheelchair.

Preferably, the first air cylinder and the second air cylinder are attached to the axle. Those of skill in the art will recognize the locations of the air cylinders on the personal conveyance can be changed without compromising the function or operation of the invention.

Preferably, the splitter is a push lock splitter, and the air fitting is a push lock air fitting. Those of skill in the art will appreciate that a variety of known splitters and air fittings or their equivalents may be used in the invention and achieve the same or similar results.

The invention also provides kits for a braking system for personal conveyances. It is contemplated that braking systems of the invention can be retrofitted to existing personal conveyances, particularly wheelchairs. These kits include first and second rotor brake hubs; first and second rotor hub clamps or an analogous means of attaching the rotor brake hubs to a personal conveyance; a first air cylinder attached to a first end of a first air hose; a second air cylinder attached to a first end of a second air hose; a splitter that has a first opening that attaches to a second end of the first air hose, and a second opening that attaches to a second end of the second air hose, and a third opening that attaches to either a third air cylinder that is attached to a manual lever or an air fitting that is attached to an air bladder; at least two air cylinder clamps or analogous means of attaching the first and second air cylinders to the personal conveyance; and a manual lever clamp or analogous means of attaching the manual level to the personal conveyance.

Preferably, kits of the invention include both a third air cylinder and an air bladder, and a suitable means of attaching each to the personal conveyance. It is preferred that an air cylinder clamp for each air cylinder is provided in kits of the invention. Those of skill in the art will appreciate that other types of clamps or attaching devices may be substituted and achieve analogous results. Similarly, it is preferred that kits of the invention includes a suitable means of attaching the air bladder to the seat of a personal conveyance. Alternatively, an air bladder can rest on top of the seat and not be attached to it.

All air cylinders included in a kit of the invention have a pin and a spring. The invention also provides methods of using an anti-rollback braking system for a personal conveyance. Methods of using a braking system for a personal conveyance comprise (a) installing a first rotor brake hub around the inside of a first wheel hub on a personal conveyance and a second rotor brake hub around the inside of a second wheel hub on the personal conveyance, (b) installing a first rotor hub clamp around the outside of the first wheel hub and a second rotor hub clamp around the outside of the second wheel hub; (c) attaching the first rotor brake hub to the first rotor hub clamp and the second rotor brake hub to the second rotor hub clamp; (d) attaching a first air cylinder and a second air cylinder to the axle of the personal conveyance, wherein both the first air cylinder and the second air cylinder include a pin and a spring; (e) attaching a first end of a first air hose to the first air cylinder; (f) attaching a first end of a second air hose to the second air cylinder; (g) attaching a second end of the first air hose to a first opening of a splitter and a second end of the second air hose to a second opening of the splitter; (h) attaching a third opening of the splitter to an air fitting that is attached to an air bladder or to a third air cylinder that has a pin and a spring and is attached to a manual lever; and (i) attaching either the air bladder to the seat or the manual lever to the frame.

When the first and second air cylinders are pressurized, either by compressing the air bladder or releasing the manual lever from the braking position, the springs in the first and second air cylinders contract and the first and second air cylinders' pins are retracted and do not extend through the rotor brake hubs. Thus, the wheels of the personal conveyance are free to rotate. Alternatively, when the first and second air cylinders are depressurized, either by decompressing the air bladder or engaging the manual lever into the braking position, the springs in the first and second air cylinders expand and the first and second air cylinders' pins are extended through the rotor brake hubs to prevent the wheels of the personal conveyance from rotating.

Methods of the invention can further comprise attaching a first end of a third air hose to the air fitting and attaching a second end of the third air hose to the air bladder.

BRIEF DESCRIPTION OF DRAWINGS

The following drawings form part of the present specification and are included to further demonstrate certain aspects of the invention. The invention may be better understood by reference to one or more of these drawings in combination with the detailed description presented herein. Unless specifically noted, articles depicted in the drawings are not necessarily drawn to scale.

DETAILED DESCRIPTION

Figure 1:
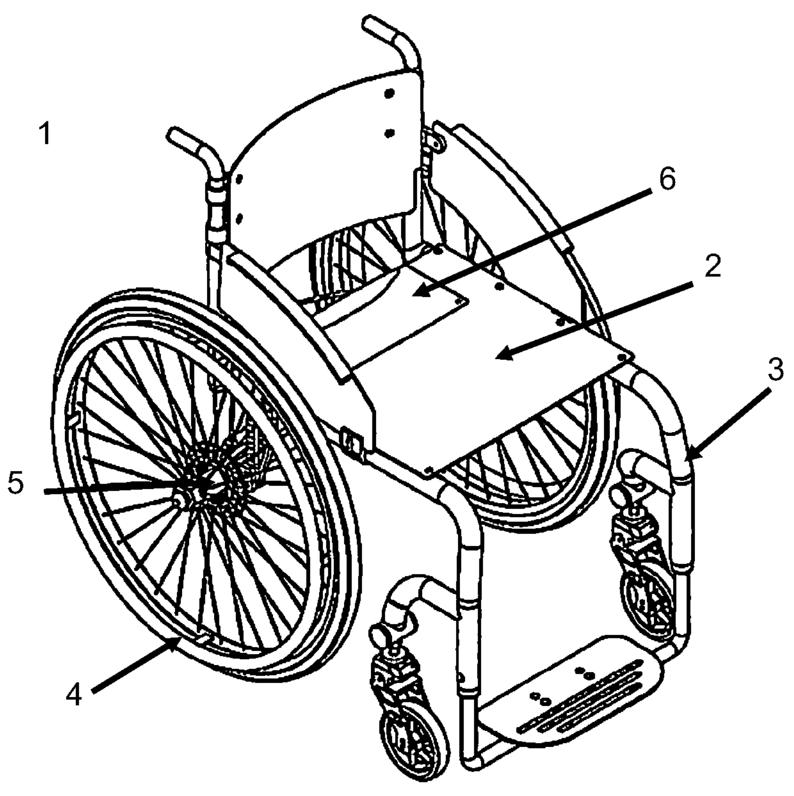
FIG. 1 is a perspective front view of a wheelchair with an embodiment of the invention installed and showing an air bladder.
Figure 2:
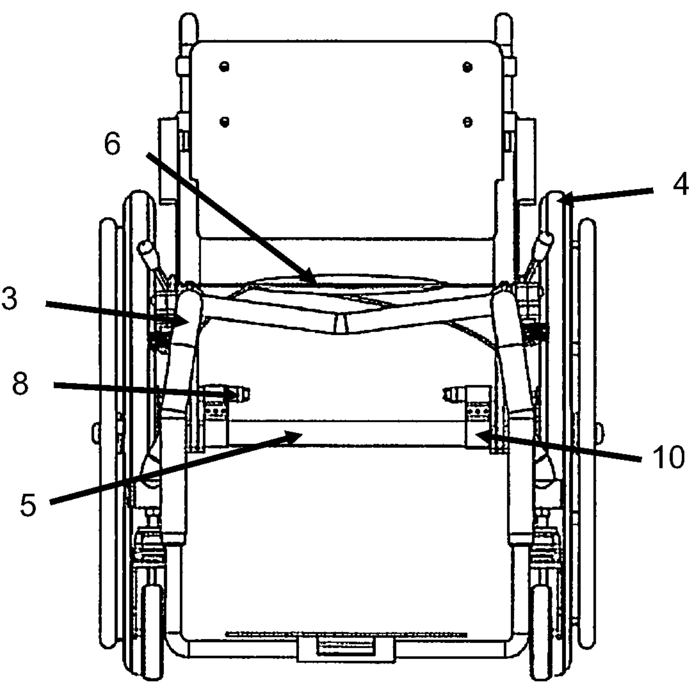
FIG. 2 is front view of the embodiment of FIG. 1.
Figure 3:
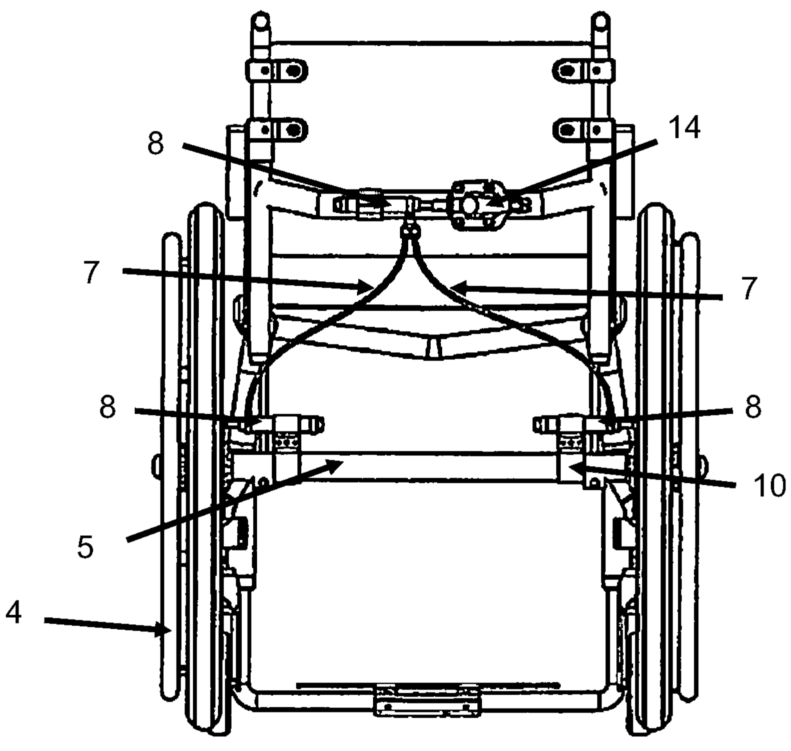
FIG. 3 is a back view of a wheelchair with the invention installed and showing a manual lever.
Figure 4:
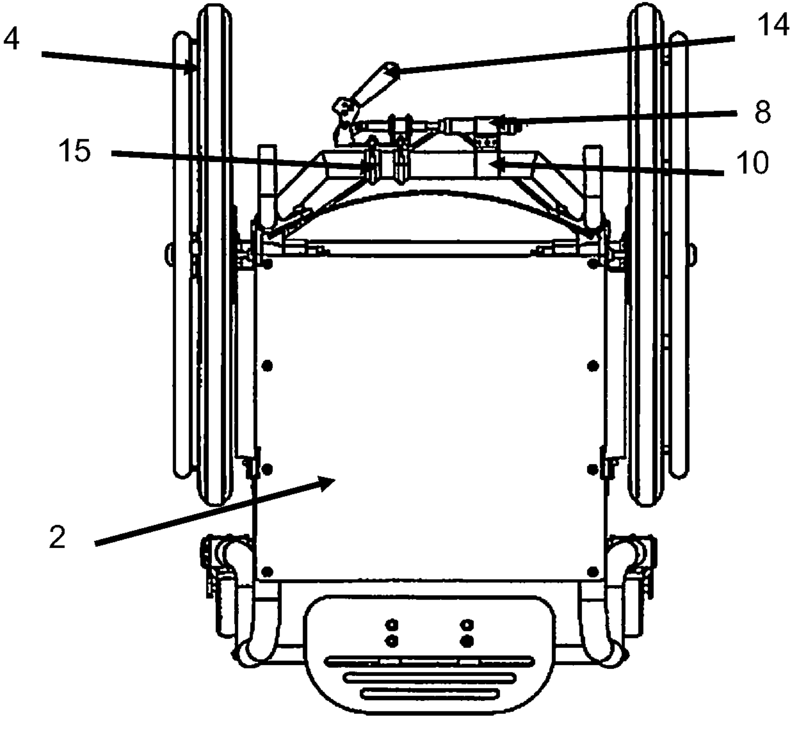
FIG. 4 is a view from above of the embodiment of FIG. 3.
Figure 5:
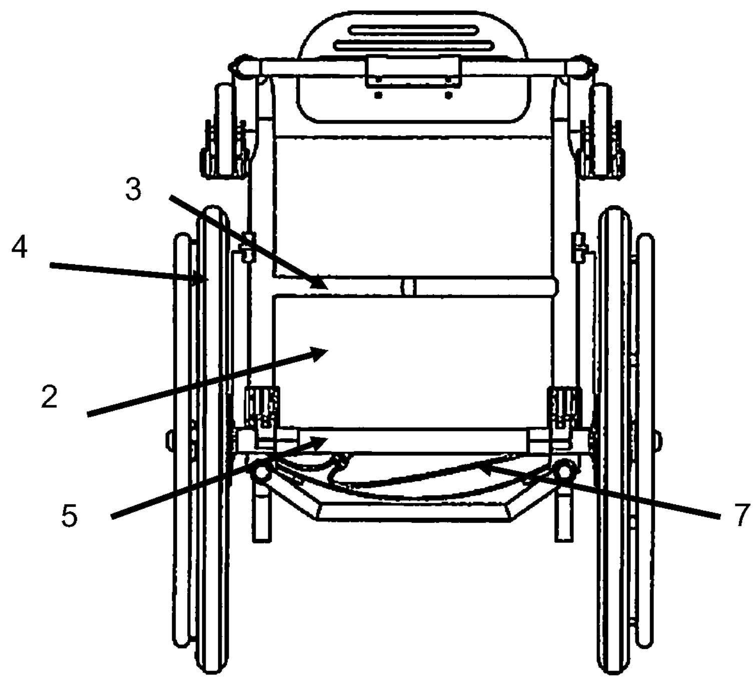
FIG. 5 is a view from below of a wheelchair with an embodiment of the invention installed.

The invention provides systems, kits, and methods that provide improved anti-rollback braking systems for personal conveyances such as wheelchairs. A pneumatic distribution system is utilized to force shafts or pins through the large wheels of a personal conveyance, such as a wheelchair, when weight is lifted off of the personal conveyance. The shafts prevent the wheels from rotating as long as the shafts are extended. Adding weight in the appropriate area (e.g. the seat) of the personal conveyance causes the shafts or pins to retract and allows the wheels to rotate freely.

The anti-rollback braking system of the invention is for a personal conveyance. Preferably the personal conveyance is a wheelchair 1, more preferably it is a manually operated one. A suitable wheelchair 1 has a seat 2 that is attached to a frame 3. An axle 5 is attached to the frame 3 and to two wheels 4 that have the primary purpose of moving the wheelchair 1 from one spot to another. Advantageously, the invention can be used with all types and sizes of mag wheels or spoke wheels. See FIGS. 1-5.

Situated around the inside of each wheel's hub is a rotor brake hub 11. Located around the outside of each wheel's hub is a rotor brake clamp 12. Each rotor brake hub 11 is attached to the adjacent rotor brake clamp 12 so that a rotor brake hub 11 in held in a fixed position against the adjoining wheel 4. Together the rotor brake hub 11 and rotor brake clamp 12 provide fixed openings through which pins or shafts 9 can be inserted to prevent the wheels 4 from rotating when the braking system is activated.

Those of skill in the art will recognize that the wheel hubs, rotor brake hubs, and rotor brake clamps can be comprised of a variety of materials. For example, aluminum, titanium, steel, stainless steel, fiberglass, carbon fiber, nylon, industrial laminated plastics that consist of woven glass cloth material and an epoxy resin matrix such as G-10, high-performance polyetherimides (PEI) such as ultem, thermoplastics such as acrylonitrile butadiene styrene (ABS) or polylactic acid (PLA), vinyls such as polyvinyl chloride (PVC), carbon filaments such as PETG, or a combination thereof may be used. The choice of which material(s) is used for manufacturing will depend upon costs, availability, weight, durability, user preferences, environments where personal conveyances are expected to be used, as well as other factors.

Figure 9A:
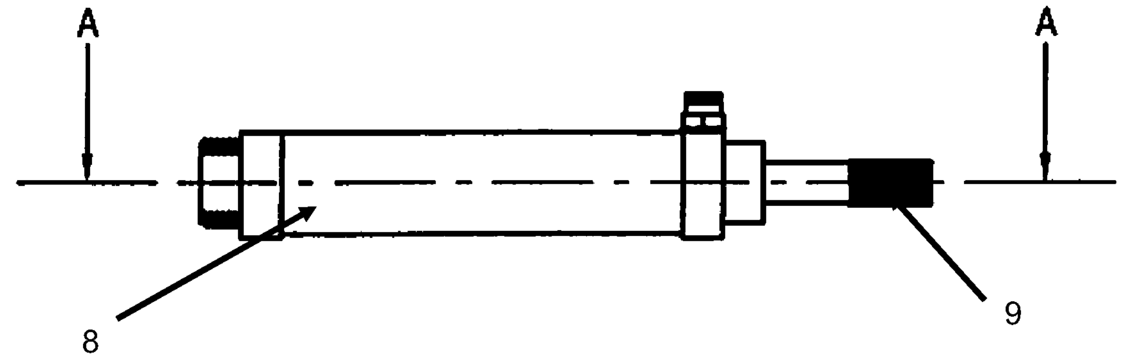
FIG. 9A illustrates an exemplary air cylinder.
Figure 9B:
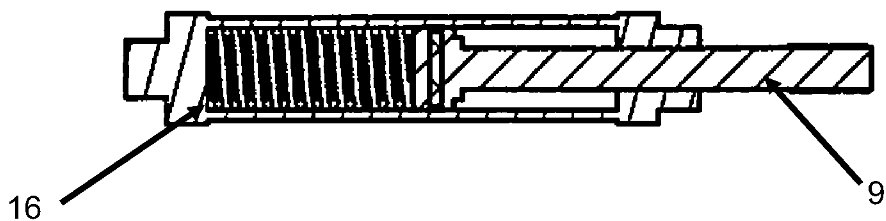
FIG. 9B is a sectional view of an air cylinder that is indicated by the dashed line A-A in FIG. 9A.

Each pin or shaft 9 is part of an air cylinder 8 that also includes a spring 16. See FIGS. 9A and 9B. When an air cylinder 8 is pressurized the spring 16 inside the air cylinder 8 contracts, and the pin or shaft 9 does not extend out from the air cylinder 8. When an air cylinder is not pressurized the spring 16 expands, or relaxes, and pushes the pin or shaft 9 to extend out of the air cylinder 8 and through an opening in the adjacent rotor brake hub 11. Those of skill in the art will recognize that a variety of air cylinders that function in this manner exist and are suitable for use in the invention. Two air cylinders 8 are attached to the axle 5 by suitable air cylinder clamps 10 so that a pin or shaft 9 from each respective air cylinder 8 can extend through the adjacent rotor brake hub 11. See FIG. 3.

Each air cylinder 8 that is attached to the axle is also attached to one end (i.e. the first end) of an air hose 7, and the other end (i.e. the second end) of the air hose 7 is attached to an opening (either the first or second opening) in a splitter 13. Another opening (a third opening) in the splitter 13 is attached to either a third air cylinder 8 or to one end (i.e. a first end) of another (i.e. third) air hose 7.

Figure 6:
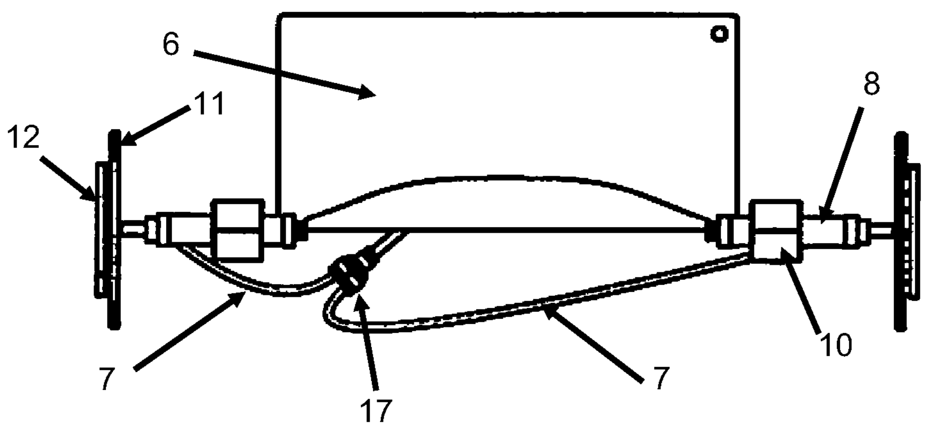
FIG. 6 illustrates an embodiment of the invention separate from a wheelchair.

Embodiments that include a third air hose 7 also include an air bladder 6. The other end (second end) of the third air hose 7 is connected to an air fitting 17 that is attached to the air bladder 6. See FIG. 6. Those of skill in the art will appreciate that a variety of suitable splitters and air fittings are available and suitable for use in the invention. Some suitable splitters and air fittings are either identical or very similar to each other and may be interchangeable. Preferred splitters and air fittings for use in the invention are push lock splitters and push lock air fittings.

In some embodiments of the invention, a third air hose 7 may not be present. Instead, an air fitting 17 (or splitter) is attached directly to an opening in the air bladder 6. Those of skill in the art will appreciate that suitable air bladders can have a variety of shapes and sizes and are made from a variety of materials. It is only necessary that the air bladder can be used as intended in the invention. The choice of air bladder will depend, at least in part, upon the physical structure of the personal conveyance and the user's preferences and physical requirements. In preferred embodiments of the invention, an air bladder 6 is attached to the seat 2 of the wheelchair 1. The air bladder 6 can be attached to the seat 2 by a variety of suitable means. The choice of the attachment means depends, at least in part, upon the user's preferences, the user's physical needs, and the type of material from which the seat is constructed.

Figure 7:
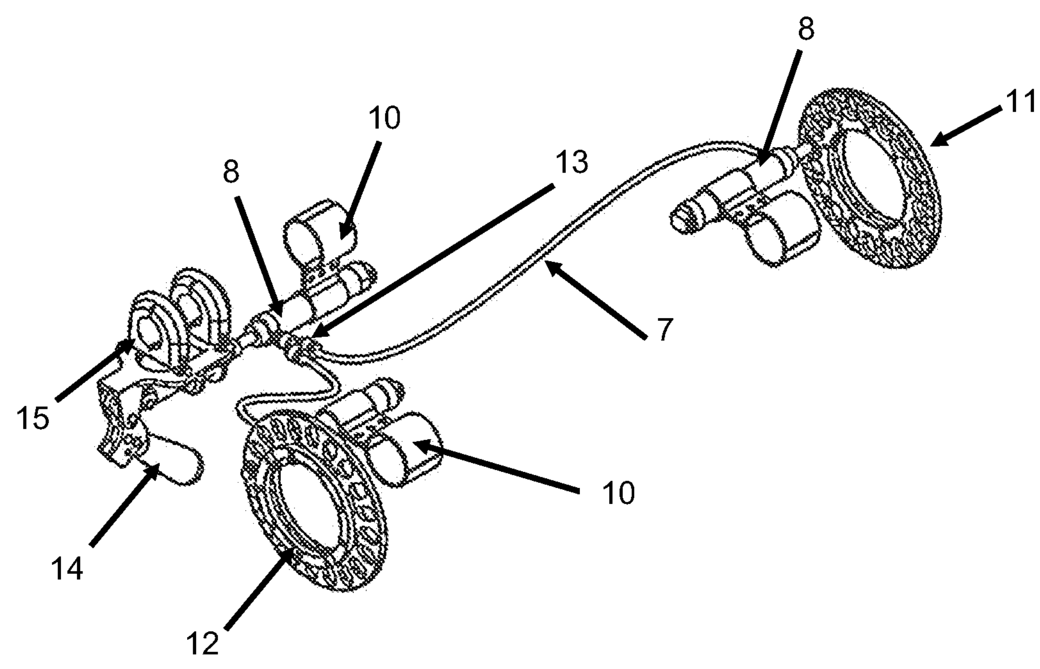
FIG. 7 is a perspective view of an embodiment of the invention separate from a wheelchair.
Figure 8:
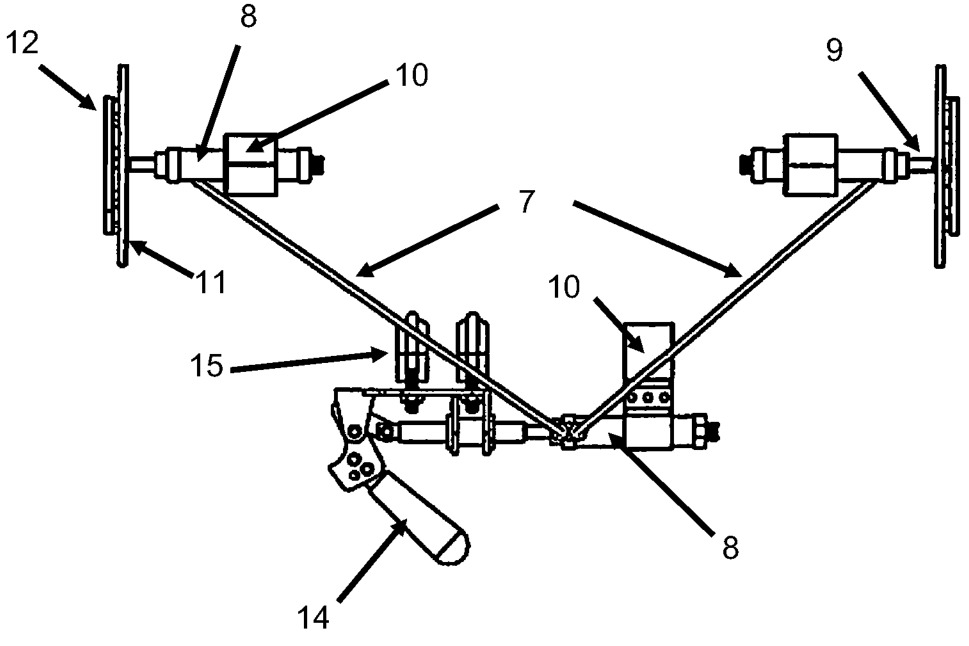
FIG. 8 is a view from above of the embodiment in FIG. 7.
Figure 10:
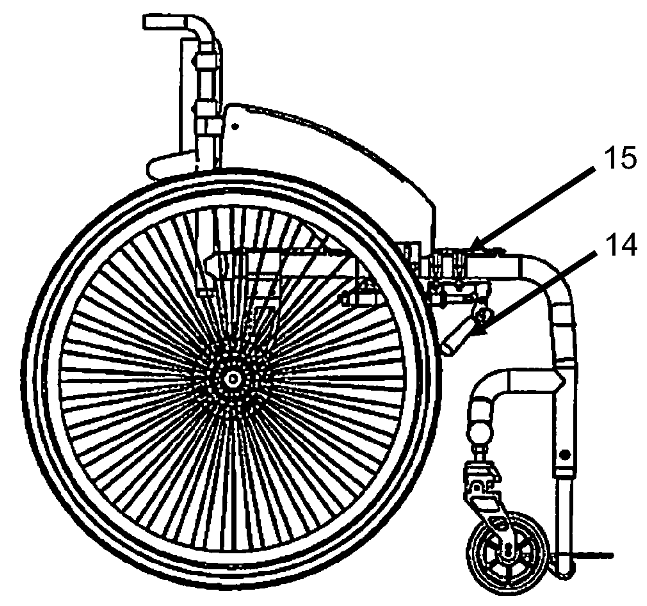
FIG. 10 illustrates an alternative exemplary location for a manual lever to operate the invention on wheelchair.
Figure 11:
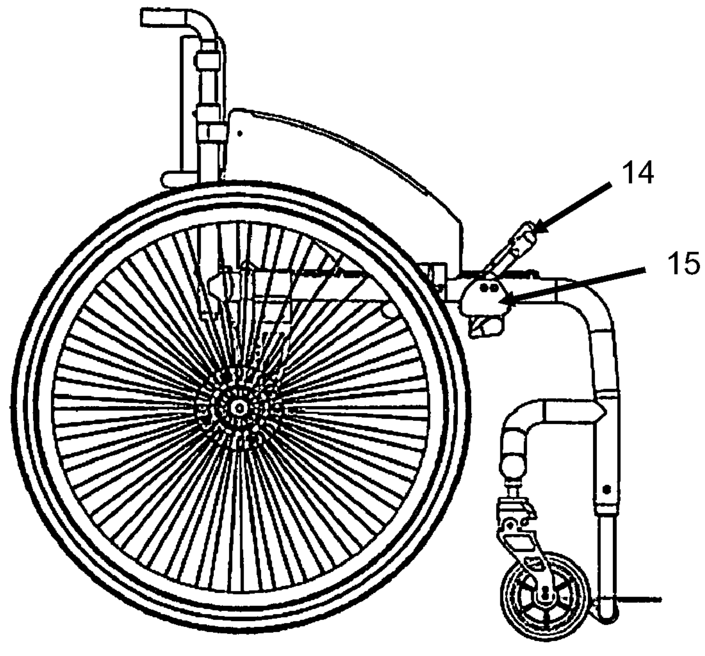
FIG. 11 illustrates another alternative location for a manual lever to operate the invention on wheelchair.

In embodiments that include a third air cylinder 8, it is attached to a manual lever 14 and a third opening in the splitter 13. See FIGS. 7 and 8. The third air cylinder 8 includes a pin 9 and a spring 16. Preferably, the third air cylinder 8 is also attached to the frame 3 by a suitable air cylinder clamp 10. Similarly, the manual lever 14 is attached to the frame 3 by a suitable clamp 15. Both the third air cylinder 8 and the manual lever 14 may be attached to the frame 3 in a variety of locations. The choice of location will depend, at least in part, upon the type of personal conveyance, a user's needs, and their personal preferences. See FIGS. 3, 10, and 11.

Adjustments to a braking system of the invention can be made by changing spring tension, air bladder placement, or the air volume. In making such adjustments, a user's weight, size, and body type should be considered. Those of skill in the art will be familiar with how to adjust the tension in a spring and the air volume in an air bladder.

To install a braking system of the invention on a wheelchair 1, a rotor brake hub 11 is installed around the inside of the hub of each wheel 4, and a rotor brake clamp 12 is installed around the outside of the hub of each wheel 4 on a wheelchair 1. Each adjacent pair of rotor brake hubs 11 and rotor brake clamps 12 are attached to each other so that the combination is fixed in place to the adjoining wheel 4. A pair of air cylinders 8 are attached the axle 5 so that a pin or shaft 9 from each air cylinder 8 can extend through an opening in the adjacent rotor brake hub 11. One end (a first end) of an air hose 7 is attached to each air cylinder 8, and the other end of the air hose 7 is attached to a splitter 13. The splitter 13 is also attached to an air fitting 17 that is attached to either an air bladder 6 or to a third air cylinder 8 that is attached to a manual lever 14. The manual lever 14 is attached to the frame 3. The air bladder 6 is placed either adjacent to or connected to the seat 2 of the wheelchair 1.

To activate the braking system of the invention to prevent the rotation of the wheels 4, the first and second air cylinders 8 are depressurized. By depressurizing the first and second air cylinders 8, the air cylinders' springs 16 are relaxed and the air cylinders' pins 9 are extended to protrude through openings in the rotor brake hubs 11 to prevent the wheels 4 from rotating.

To inactivate the braking system of the invention, the first and second air cylinders 8 are pressurized sufficiently so that their springs 16 contract and their pins or shafts 9 are retracted. Retracting the pins or shafts 9 allows the wheels 4 to rotate.

An air cylinder can also be referred to as a linear pneumatic actuator.

Unless defined otherwise, all technical and scientific terms used herein have the same meaning as is commonly understood by one of skill in the art to which this invention belongs at the time of filing. Terminology used herein is for the purpose of describing particular embodiments of the invention and is not intended to be limiting. The meaning and scope of terms should be clear; however, in the event of any latent ambiguity, definitions provided herein take precedent over any dictionary or extrinsic definition. Further, unless otherwise required by context, singular terms shall include pluralities and plural terms shall include the singular unless the content clearly dictates otherwise. Herein, the use of "or" means "and/or" unless stated otherwise. Furthermore, the use of the term "including", as well as other forms such as "includes" and "included" is not limiting. As used herein, "each" refers to each member of a set or each member of a subset of a set.

What is claimed is:

1. A braking system for a personal conveyance comprising a. a first rotor brake hub around the inside of a first wheel's hub on a personal conveyance; a second rotor brake hub around the inside of a second wheel's hub on the personal conveyance, wherein the personal conveyance has a seat and an axle that is attached to the first wheel, the second wheel, and a frame, and the seat is attached to the frame;

b. a first rotor hub clamp attached to the first rotor brake hub and a second rotor hub clamp attached to the second wheel hub;

c. an air bladder attached or adjacent to the seat;

d. a first air cylinder attached to a first end of a first air hose, wherein a second end of the first air hose is attached to a first opening in a splitter and the first air cylinder has a pin and a spring;

e. a second air cylinder attached to a first end of a second air hose, wherein a second end of the second air hose is attached to a second opening in the splitter and the second air cylinder has a pin and a spring; and f. a third air cylinder or an air fitting, wherein the third air cylinder is attached to a manual lever and a third opening in the splitter or the air fitting has a first end attached to the third opening in the splitter and a second end attached to the air bladder or a third air hose.

2. The braking system of claim 1, wherein the third air cylinder has a spring and a pin.

3. The braking system of claim 1, wherein both the third air cylinder and the air fitting are present.

4. The braking system of claim 1, wherein the first air cylinder and the second air cylinder are attached respectively to the axle by an air cylinder clamp.

5. The braking system of claim 1, wherein the splitter is a push lock splitter.

6. The braking system of claim 1, wherein the air fitting is a push lock air fitting and is attached to the air bladder directly or by a third air hose having a first end attached to the air bladder and a second end attached to the air fitting.

7. The braking system of claim 1, wherein the third air cylinder is attached to the frame by an air cylinder clamp.

8. The braking system of claim 1, wherein the manual lever is attached to the frame by a clamp.

9. The braking system of claim 1, wherein the personal conveyance is a wheelchair.

10. A kit for a braking system for a personal conveyance having a. a first and a second rotor brake hub;

b. a first and a second rotor hub clamp;

c. a first air cylinder attached to a first end of a first air hose;

d. a second air cylinder attached to a first end of a second air hose;

e. a splitter having a first opening attached to a second end of the first air hose, a second opening attached to a second end of the second air hose, and a third opening attached to either a third air cylinder that is attached to a manual lever or an air fitting that is attached to an air bladder;

f. at least two air cylinder clamps; and g. a manual lever clamp.

11. The kit of claim 10 further comprising both the third air cylinder and the air bladder.

12. The kit of claim 10, wherein each air cylinder has a pin and a spring.

13. A method of using a braking system for a personal conveyance comprising a. installing a first rotor brake hub around the inside of a first wheel hub on a personal conveyance and a second rotor brake hub around the inside of a second wheel hub on the personal conveyance, wherein the personal conveyance includes an axle that is attached to the first wheel, the second wheel, and a frame, and a seat that is attached to the frame;

b. installing a first rotor hub clamp around the outside of the first wheel's hub and a second rotor hub clamp around the outside of the second wheel's hub;

c. attaching the first rotor brake hub to the first rotor hub clamp and the second rotor brake hub to the second rotor hub clamp;

d. attaching a first air cylinder and a second air cylinder to the axle, wherein both the first air cylinder and the second air cylinder include a pin and a spring;

e. attaching a first end of a first air hose to the first air cylinder;

f. attaching a first end of a second air hose to the second air cylinder;

g. attaching a second end of the first air hose to a first opening of a splitter and a second end of the second air hose to a second opening of the splitter;

h. attaching a third opening of the splitter to an air fitting that is attached to either an air bladder or to a third air cylinder that has a pin and a spring and is attached to a manual lever; and i. attaching either the manual lever to the frame or placing the air bladder adjacent to or connected to the seat, wherein compressing the air bladder or releasing the manual lever pressurizes the first and second air cylinders to contract their springs and retract their pins into the first and second air cylinders and decompressing the air bladder or engaging the manual lever depressurizes the first and second air cylinders to relax their springs and extend their pins so that the pins in the first and second air cylinders protrude through openings in the first and second rotor brake hubs and prevent the first and second wheels from rotating.

14. The method of using the braking system of claim 13, wherein the personal conveyance is a wheelchair.

15. The method of using the braking system of claim 13 further comprising attaching a first end of a third air hose to the air fitting and attaching a second end of the third air hose to the air bladder.

* * * * *